Feb. 6, 1934.   W. C. PITTER   1,945,702
VARIABLE SPEED TRANSMISSION
Filed Feb. 10, 1930   15 Sheets-Sheet 7

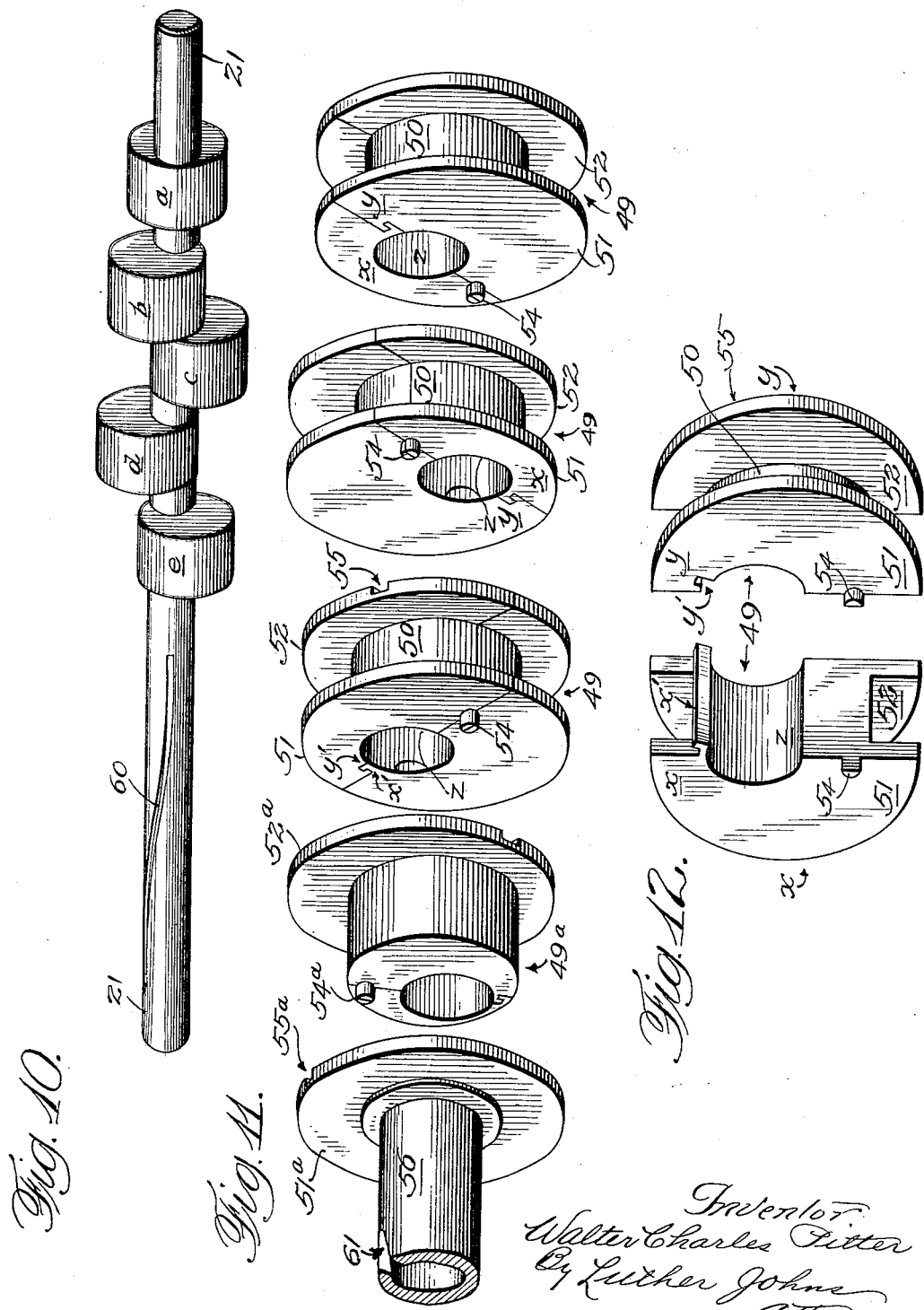

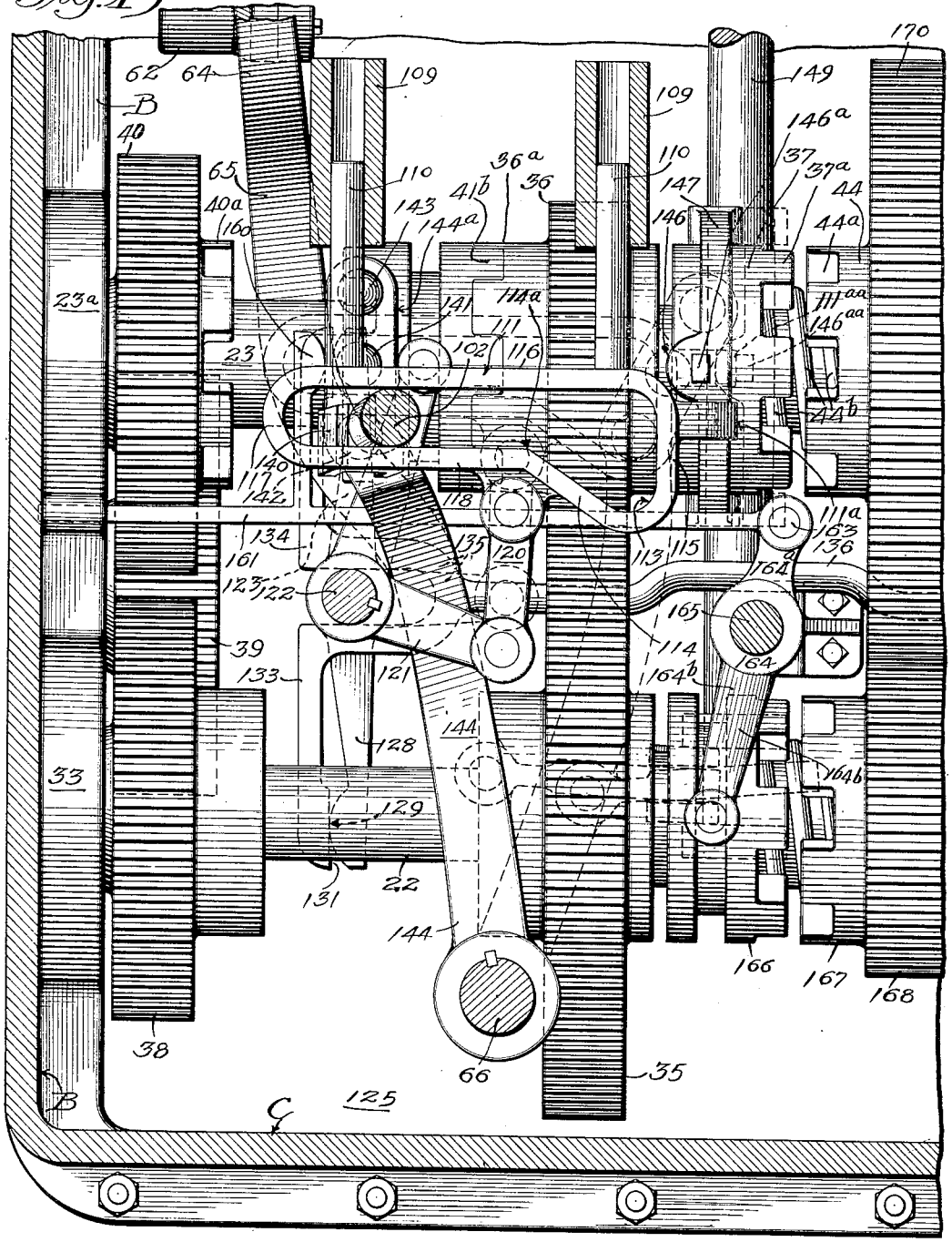

Feb. 6, 1934.    W. C. PITTER    1,945,702
VARIABLE SPEED TRANSMISSION
Filed Feb. 10, 1930    15 Sheets-Sheet 12
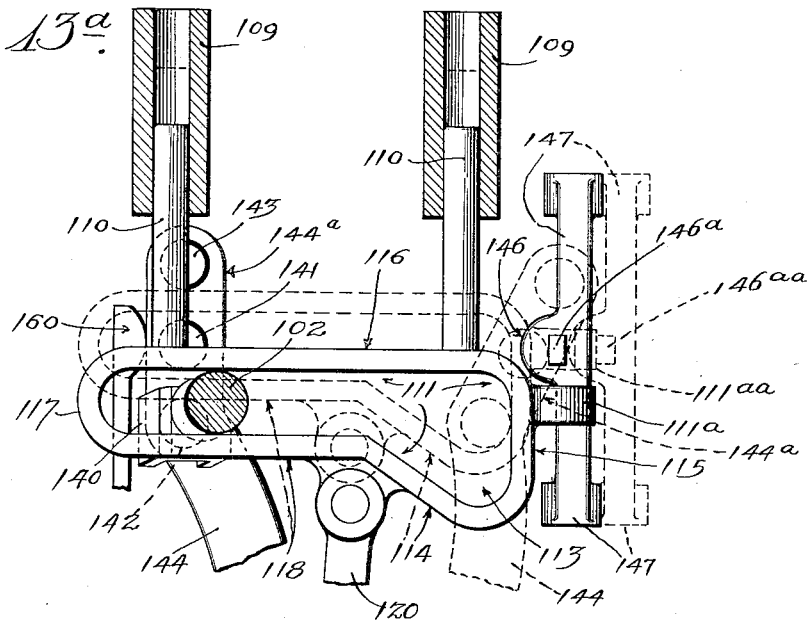
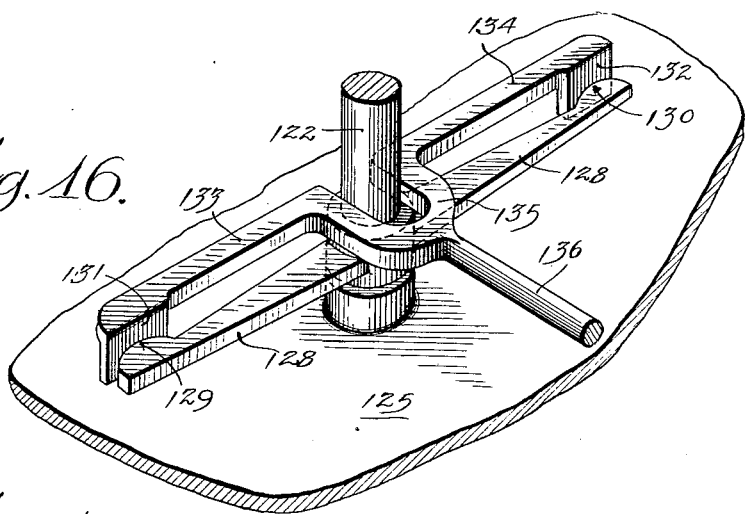
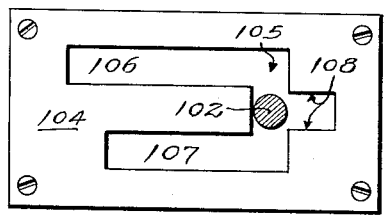

Feb. 6, 1934. W. C. PITTER 1,945,702
VARIABLE SPEED TRANSMISSION
Filed Feb. 10, 1930 15 Sheets-Sheet 13

Inventor
Walter Charles Pitter
By Luther Johns
Atty.

Feb. 6, 1934.   W. C. PITTER   1,945,702
VARIABLE SPEED TRANSMISSION
Filed Feb. 10, 1930   15 Sheets-Sheet 14

Inventor
Walter Charles Pitter
By Luther Johns,
Atty.

Feb. 6, 1934. W. C. PITTER 1,945,702
VARIABLE SPEED TRANSMISSION
Filed Feb. 10, 1930 15 Sheets-Sheet 15

Inventor
Walter Charles Pitter
By Luther Johns
atty.

Patented Feb. 6, 1934

1,945,702

UNITED STATES PATENT OFFICE 1,945,702

VARIABLE SPEED TRANSMISSION

Walter Charles Pitter, Epping, England, assignor to The Pitter Trust, Chicago, Ill., a common-law trust Application February 10, 1930. Serial No. 427,224

14 Claims. (Cl. 74—117)

These improvements relate to variable speed transmission devices, and more specifically to the kind in which the output speed may be varied in fine gradations from one extremity of speed range to the other.

While there are many occasions for the use of such a device, I may point out, by way of illustration, some of the objects and advantages of such a specific application as to an automobile. In such a use the driver could put his engine into operation and then by moving his control lever successively from neutral position to a position near the end of its travel, he would start the car and accelerate its travel through all of the variations in speed from zero to what would normally be known as the high or final speed ratio between the engine speed and that of the shaft leading to the driving wheels. Through such a lever movement the ratio of output shaft speed to input shaft speed is increased until a ratio of approximately one to one is reached. At this stage, by further moving the control lever in the same direction the speed-varying mechanism is cut out of operation and the output shaft is put into driving relation with the input shaft whereby there is a direct, or more direct, drive from the engine, at the engine speed, with the speed-varying mechanism temporarily out of service, and it remains out of service so long as the automobile is being operated at the engine speed, which is probably at least ninety per cent of the time that the vehicle is in travel. When the operator desires to reduce the speed he simply moves the control lever in the reverse direction, disconnecting the output shaft from the input shaft and reconnecting the output shaft with the variable-speed mechanism, and by continuing the reverse movement of the control lever the car may be driven at all or any of the intermediate speed ratios down to zero. The accelerations and decelerations are gradual, making for great smoothness in the operation of the vehicle, the avoidance of a more or less complicated lot of movements, the clashing of gears, etc.

Another feature of the improvements as applied to an automobile is in an auxiliary control by means of a foot lever whereby when the pedal is depressed the means for driving the output shaft are disconnected and remain so as long as the pedal is held down. The car in such case may coast, or run free of the driving power. On letting the pedal come back, in response to spring action, the driving power is thereby reconnected to the driving shaft, and this is true whatever position the hand lever may be in.

The objects of the invention include the provision of a variable-speed transmission which may be embodied as a substantially small and compact unit; to provide a device of this kind which is comparatively simple, and of relatively few parts, and of a design and construction well adapted to withstand the strains of service; to provide a device of this kind in which, while the output speed is not entirely regular, speaking critically, it has so close an approximation of regular speed as to render it highly useful and advantageous in most of the applications where a variable speed device is required, for example in automobiles; to provide constructions according to which a single control lever may afford the operator all the control movements and results he needs in many applications, although, as indicated the auxiliary foot pedal control is advantageous in an automobile; to provide, in more specific respects, means for disconnecting some of the functional parts at times when their operation is unnecessary, thus saving wear and tear and loss of power. One of the highly important features is the provision of means whereby the driving power may be communicated directly to the output shaft under the conditions of heaviest and more frequent and usually continuous use whereby the variable speed mechanism is saved from needless operation. Other objects and advantages will appear hereinafter.

In the drawings Figure 1 is a side elevation of a variable speed device embodying my present invention, with the side wall of the casing broken away;

Fig. 10 is a perspective of the cam shaft and its fixed cams;

Fig. 11 is a fragmentary and "exploded" view showing in perspective some of the outer cams or eccentrics and a part of the device which actuates them for throw-varying adjustments;

Fig. 12 is a perspective of one of the outer cam members with its parts separated;

Fig. 13 is a fragmentary plan view showing changed positions of control mechanism shown in Fig. 3; Fig. 13a is a view following Fig. 13, with many parts omitted.

Fig. 16 is an enlarged perspective of details showing a rocking device for actuating a clutch;

Fig. 17 (sheet containing Fig. 9) is a top plan of the hand lever guide plate.

Figure 4:
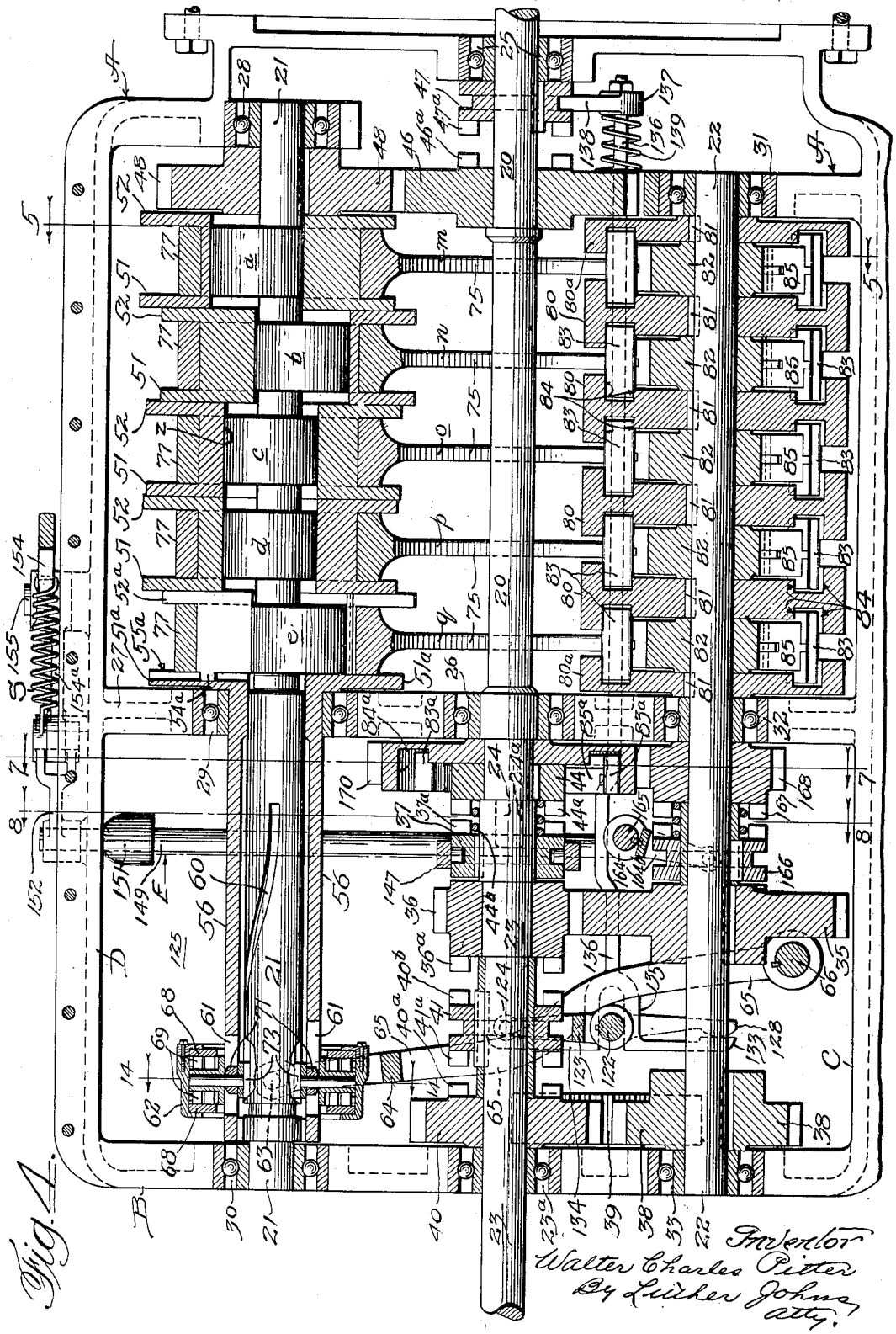
Fig. 4 is a horizontal section as on the line 4—4 of Fig. 1.

Referring to Fig. 4, as a convenient illustration, there are four main operating shafts, namely, the input shaft 20, the cam shaft 21, the clutch shaft 22, and the output shaft 23. Shaft 23 is end to end and coaxial with input shaft 20. It is journaled at 23a in the rear end wall of the housing. Shaft 20 has a reduced cylindrical end 24 projecting as a bearing member into a recess 24a in the inner end of output shaft 23. The outer end of input shaft 20 is journaled in the bearing 25 while its inner end is supported by bearing 26 in the housing partition wall 27. Cam shaft 21 is journaled at 28 in the front end wall of the housing, at 29 in partition wall 27, and at 30 in the rear end wall of the housing. Clutch shaft 22 is similarly journaled at 31, 32 and 33.

The first prime object of the construction is to drive output shaft 23 at gradually-varying speeds when the speed of the input shaft is, for example, constant. Stated otherwise, the object is to provide varying ratios of output speed to input speed. If clutch shaft 22 be a variable speed shaft then the gear 35 keyed upon shaft 22 and meshing with pinion 36 adapted to be clutched to output shaft 23 will rotate shaft 23 variably, and, since the ratio of gear 35 to pinion 36 is two to one, the output speed will be double that of clutch shaft 22.

Figure 5:
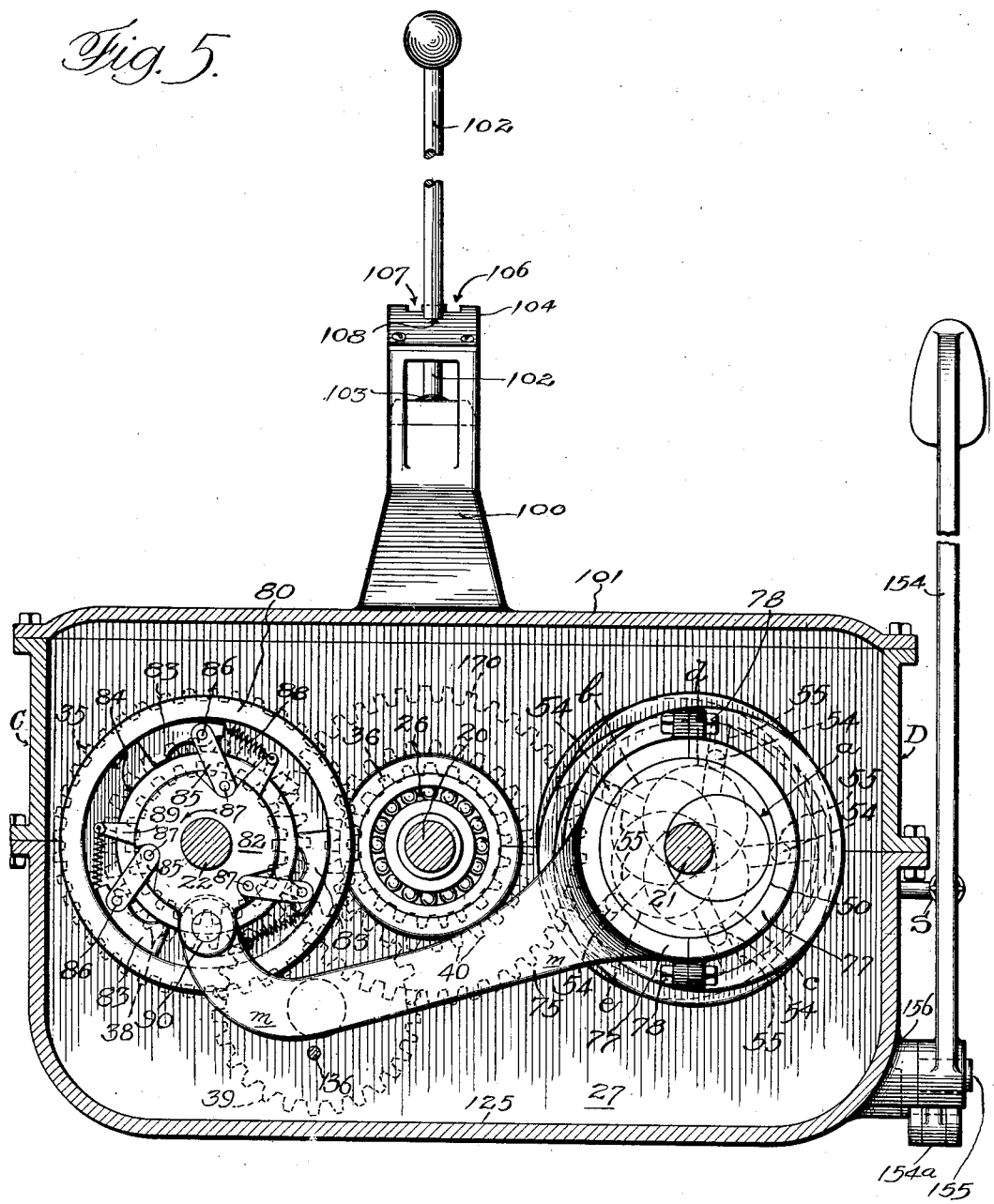
Fig. 5 is a front end elevation with the front wall broken away, as on the line 5—5 of Fig. 3 showing the cams in retracted or neutral position.

Assume clutch shaft 22 to be rotating counter-clockwise as viewed from the input and, namely, viewed from the right in Fig. 4. An arrow in Fig. 5 shows this counter-clockwise direction. The gearing 35—36 produces a clockwise direction of rotation of the output shaft 23, and that is also the direction of rotation of input shaft 20. If input shaft 20 were clutched to output shaft 23, as by clutch device 37 (the driven relation of shaft 23 to clutch shaft 22 being broken) then the driving power is conveyed directly to output shaft 23 from input shaft 20.

On clutch shaft 22 is a pinion 38 meshing with an idler 39 which in turn meshes with a pinion 40 loosely mounted on output shaft 23. Pinion 40 has a clutch face 40a adapted to interengage with clutch face 41a of double-faced clutch 41 splined for longitudinal movement on output shaft 23. Clutch 41 has a face 41b adapted to mesh with face 36a of pinion 36. Now if clutch 41 be moved to the right in Fig. 4 pinion 36 will be clutched to shaft 23 for clockwise rotation of shaft 23, and then if clutch 41 be moved sufficiently to the left pinion 40 will be clutched to shaft 23 and, because of the idler pinion 39, the direction of shaft 23 will be reversed. Clutch 41 is shown in its neutral or inoperative position.

For clutching input shaft 20 directly to output shaft 23 consider first the collar 44 rigidly secured by a key at the inner end of input shaft 20. This collar has a clutch face 44a adapted to intermesh with clutch face 37a of clutch 37 which is splined for sliding longitudinal movement on the inner end of output shaft 23. Moving clutch 37 to the right as viewed in the drawings therefore clutches the input shaft and output shaft together.

Figure 6:
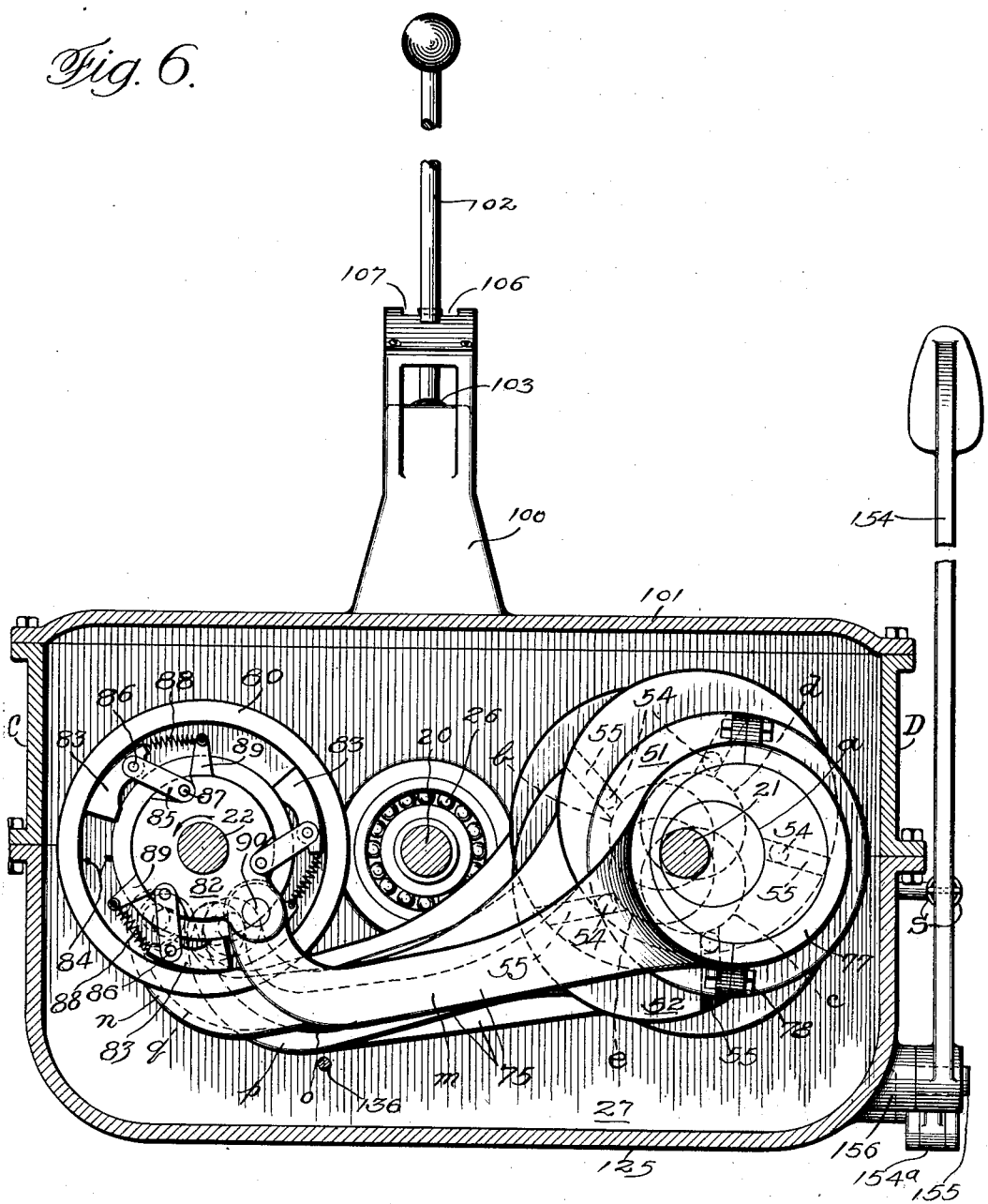
Fig. 6 is a view also on the line 5—5 of Fig. 3, but showing the cams in expanded position, for their greatest throw.

Except for a changed position of control parts shown in Fig. 13 and the expanded cam illustration of Fig. 6 all of the drawings show the mechanism as a whole and as to its respective parts in the neutral or nonoperative relative position or positions respectively.

Let us now consider how clutch shaft 22 becomes a variable-speed shaft.

On input shaft 20 is a gear 46 having a clutch face 46a. Splined for sliding longitudinal movement on shaft 20 is a single-faced clutch 47 having a clutch face 47a adapted to engage with face 46a. Moving clutch 47 to the left as viewed clutches gear 46 to input shaft 20.

On cam shaft 21 is rigidly secured a gear 48 of the size of gear 46 and meshing therewith, and thus cam shaft 21 is rotated at one to one ratio with the input shaft. Its rotation is counter-clockwise as viewed from right toward the left in Fig. 4.

See Fig. 10 for a view of cam shaft 21. It has five fixed cylindrical eccentric cams a, b, c, d and e, and these and the shaft may be considered to be turned out of a piece of bar steel so that everything shown in Fig. 10 is one piece. Fig. 5 shows more clearly how these cams are equidistantly staggered about the axis of shaft 21. Fig. 5 also shows that if we assume them all to be exerting a pulling force, one after the other, in a given direction, as toward the right in Fig. 5, they will exert this force in the following order (the shaft 21 running counter-clockwise), a, c, e, b, d. Looking at Fig. 10 again we note that this order is the first, third, fifth, second and fourth of the cams from a to e. Such an alternating order for the pulling strains distributes the load more equally over the cam shaft and avoids certain flexings of the shaft which might otherwise under some conditions become of some importance.

Turning to Fig. 12 we see one of four outer cam members 49 each comprising two body parts x and y adapted at x' and y' to interlock with each other. When united they form a cylindrical part 50 and a pair of flange parts 51, 52 and there is a bore z through all of these parts, the bore being off center with respect to the periphery of the cylindrical part 50 and, incidentally, off center also with respect to the periphery of the flanges 51 and 52. The bore z is such that an outer cam 49 will have a fine working fit upon a cylindrical inner cam as a. Cams 49 may be made in two parts as shown to facilitate placing them on the respective inner cams a, b, c, etc.

Note the projection 54 on flange 51. This projection is shown as a cylindrical pin extending from the face of the flange. Half of this pin 54 is on part x and the other half of it is on part y. Note the radial recesses 55 in the respective flanges 52. The pins 54 and the recesses 55 are staggered around the axis of the cam shaft 21 in the same order as are the inner cams a, b, c, etc., as described. Fig. 5 shows the arrangement of these pins and recesses. In assembling the adjustable or outer cams 49 with the inner cams a, b, c and d the pins 54 are caused to enter the coacting slots 55 and thus the parts x—y are locked together and all of the cams 49 are locked to each other in a series so that if one of them be turned axially the same turning movement is communicated through the pin and slot connection to the next and so on to all of them. The radial slot 55 is a long one to permit inward and outward movement of the pins 54 with respect to the axis of cam shaft 21 when the outer cams 49 are adjustably turned to vary the throw of the respective cam units.

A modification of these outer or adjustable cams occurs with respect to the end ones (Fig. 11) marked 49a. The right hand end of the construction has a flange 52a like flange 52. The driving or control pin 54a projects from the body of the cylindrical cam instead of from the flange as in the other instances, and this pin 54a coacts with a slot 55a in a flange 51a carried by a sleeve 56. Briefly the difference between cam units 49 and cam unit 49a—51a is that the left hand flange of the latter is a separate member and is connected with the member which adjustably moves and holds all of the outer or the adjustable cams. The constructions shown permit the ready assembling of the parts in self-holding relations.

With pin 54a in slot 55a, and with the pins 54 in their coacting slots 55, with the outer cams on the inner cams, any rotative movement of the sleeve 56 relative to the cam shaft 21 will simultaneously cause all of the outer cams to move about on the inner cams, and thus the relations to each other of high and low surfaces on the coacting inner and outer cams is varied.

When the device is in neutral and not delivering any power, although the cam shaft 21 is rotating, the outer cams 49—49a have their outer peripheries respectively exactly centered with the axis of shaft rotation, and therefore they are rotating simply on coaxial cylinders. But the outer cams may be turned on the inner cams so as to develop eccentricity in the outer cams. Since the inner cams (Figs. 5 and 10) are regularly staggered around the axis of revolution the outer cams must similarly be staggered so that the high side of the outer cams is directly opposite the low side of the inner cams respectively to produce the concentric or neutral effect of the outer tread surfaces of the outer cams as mentioned, and by neutral in this connection I mean that they are unable to produce reciprocating motion. The respective arrangements of the pins 54—54a and that of their coacting slots 55—55a determine the orientation of the outer cams with respect to the inner cams.

It is not broadly new at this time to provide a cam shaft having inner cams and outer cams coacting to produce various degrees of eccentricity in a variable-speed transmission device, but I have shown herein various novel features of construction, etc. in connection with this cam organization.

Figure 8:
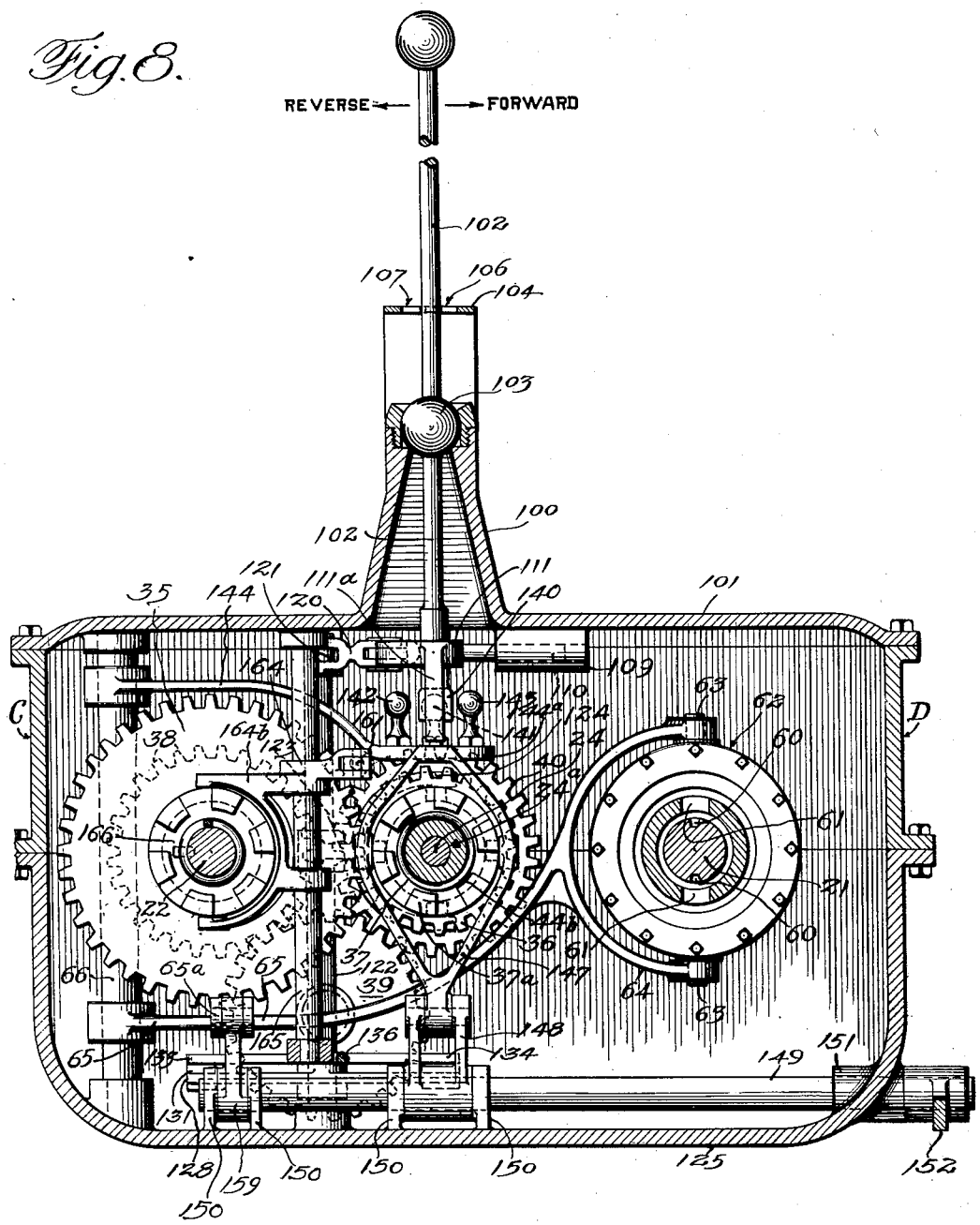
Fig. 8 is a vertical section on the line 8—8 of Fig. 3.

The means for turning the inner and outer cams relative to each other are as follows: In Fig. 10 the cam shaft 21 is seen to contain a longitudinally-extending spiral groove 60 which has a quarter turn or ninety degrees throughout that part of it which is effective for operation. For purposes of assembly the groove extends to the end of the shaft. There are two such grooves 60 one hundred and eighty degrees apart, as shown in Fig. 8. Fitting for movement upon the cam shaft 21 is the sleeve 56, Fig. 11. It is shown sectionally in Fig. 4 where the sleeve 56 is seen to extend from the flange 51a to the bearing 30. Sleeve 56 has a pair of spiral slots 61 (Fig. 14), seen fragmentarily in Fig. 4 also, and in perspective in Fig. 3, while their opposed relation to each other is seen in Fig. 8. They twist around in a direction reverse to that of the grooves 60 in shaft 21, and likewise have a twist of ninety degrees through that part of their distance rendered effective by the movement of the control means.

Figure 14:
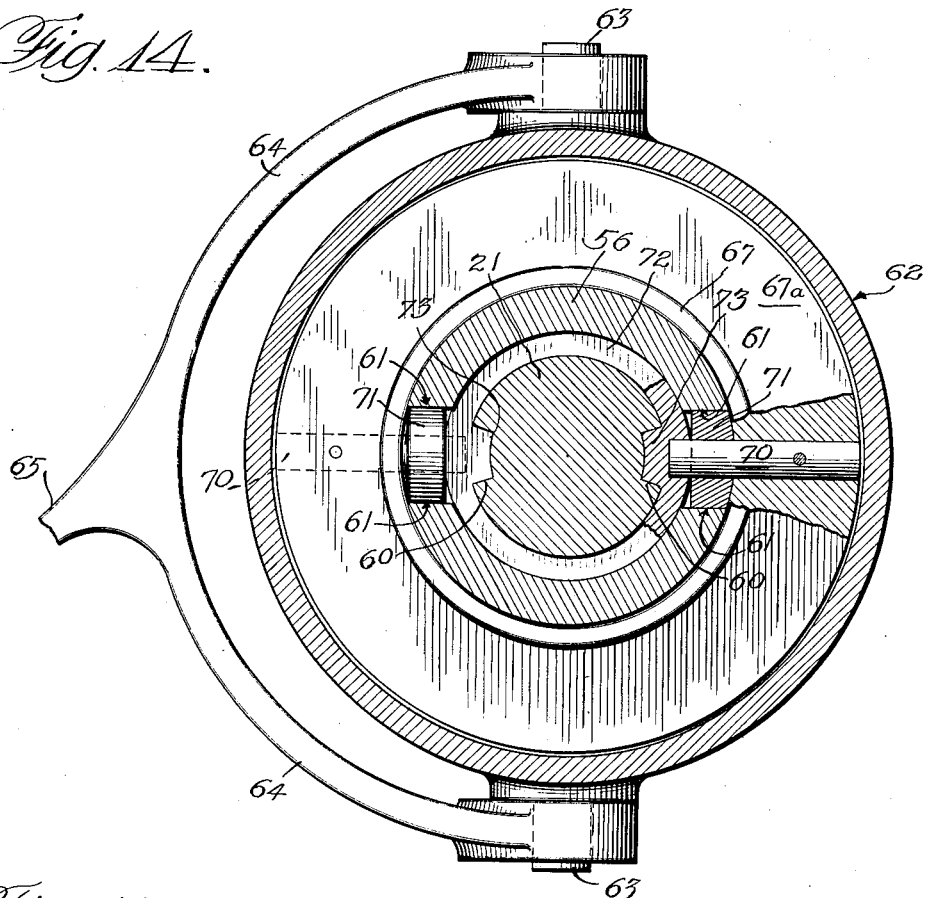
Fig. 14 is an enlarged sectional view of cam-control means on the line 14—14 of Fig. 4.
Figure 15:
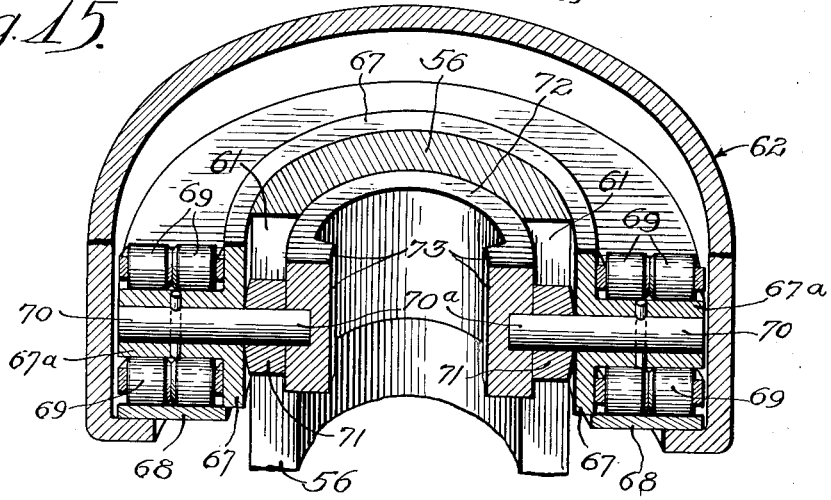
Fig. 15 is a fragmentary perspective of parts shown in Fig. 14.

Fig. 14, an enlarged section taken on Fig. 4, shows the construction of parts for turning the sleeve 56 relative to the cam shaft. See also Fig. 15. There is an outer casing 62 trunnioned at 63 in a bracket 64 having a lever arm 65 which, from Fig. 4, will be seen extending to a vertical shaft 66, and it will be perceived that if shaft 66 is turned in the clockwise direction as viewed in Fig. 4 the housing 62 will be moved to the right. Returning to Figs. 14 and 15 housing 62 contains a ring 67 having a central and radial flange 67a. The ring 67 has a sliding fit upon the sleeve 56. On opposite sides of the central flange 67a are washer-like discs, 68, and between the discs 68 and the extension 67a are roller bearings 69. The side walls of the casing hold the washers 68. Extending radially through holes in the ring 67 are two oppositely-disposed stud shafts 70 secured rigidly in the ring. Each stud shaft 70 carries a roller 71 occupying the slot 61 in sleeve 56. The inner ends 70a of the stud shaft 70 extend into what may be termed a nut 72 slidable within the sleeve 56 and also slidable upon the cam shaft 21. The nut 72 is thus held for longitudinal movement with the casing 62. There are oppositely-disposed screw-thread projections 73 on nut 72 having the pitch of the groove 60 in the cam shaft and interengaging therewith.

From the foregoing it will be clear that when the casing 62 is moved to the right in Fig. 4, and then back to the left, the forces of such movements are communicated through the rollers 69 to the ring 67—67a and thence to the stud shaft 70, the roller 71 of which moves the sleeve 56 in one direction and then the other, the tendency being to move shaft 21 in the opposite direction through the nut teeth 73. Since the effective twist of the groove 60 and slot 61 is in each instance ninety degrees and in opposite directions, the full throw of the casing 62 effects a relative movement of the sleeve to the cam shaft of one hundred and eighty degrees. This moves the outer cams relative to the inner cams one hundred and eighty degrees, so that if at the starting point, as shown in Fig. 4, being the neutral position of the device as a whole, the inner and outer cams are neutral, or without any exterior eccentricity, the full throw of the housing 62 effects the maximum eccentricity of the cam units.

In this connection it is to be pointed out that the ring 67—67a and its connected parts are free to rotate within the housing 62. This is necessary because shaft 21 is rotating and that rotates the nut 72 which moves the stud shaft 70 which in turn carries roller 71 which moves sleeve 56 and also the ring 67—67a. The relative adjustment of cam shaft 21 and sleeve 56 occurs by reason of the fact that the groove 60 and the slot 61 in them respectively are twisted in opposite directions. The actual effect, probably always but at least when the cam shaft is rotating, is merely to move the sleeve around relative to the cam shaft, because the cam shaft is rotating under power and would not be influenced either forward or backward by these adjustments. The adjustments give the sleeve a double portion of movement at each stage due to the combined actions of the oppositely twisted ways in the cam shaft and sleeve respectively.

We have thus far shown, with respect to the cams, how they may be adjusted to vary their respective throws from zero to their full eccentricity, and we have seen that these five cam units are equally staggered so that they may provide as a whole a succession or series of overlapping actions should cam pitmen be applied in a common direction.

Figure 3:
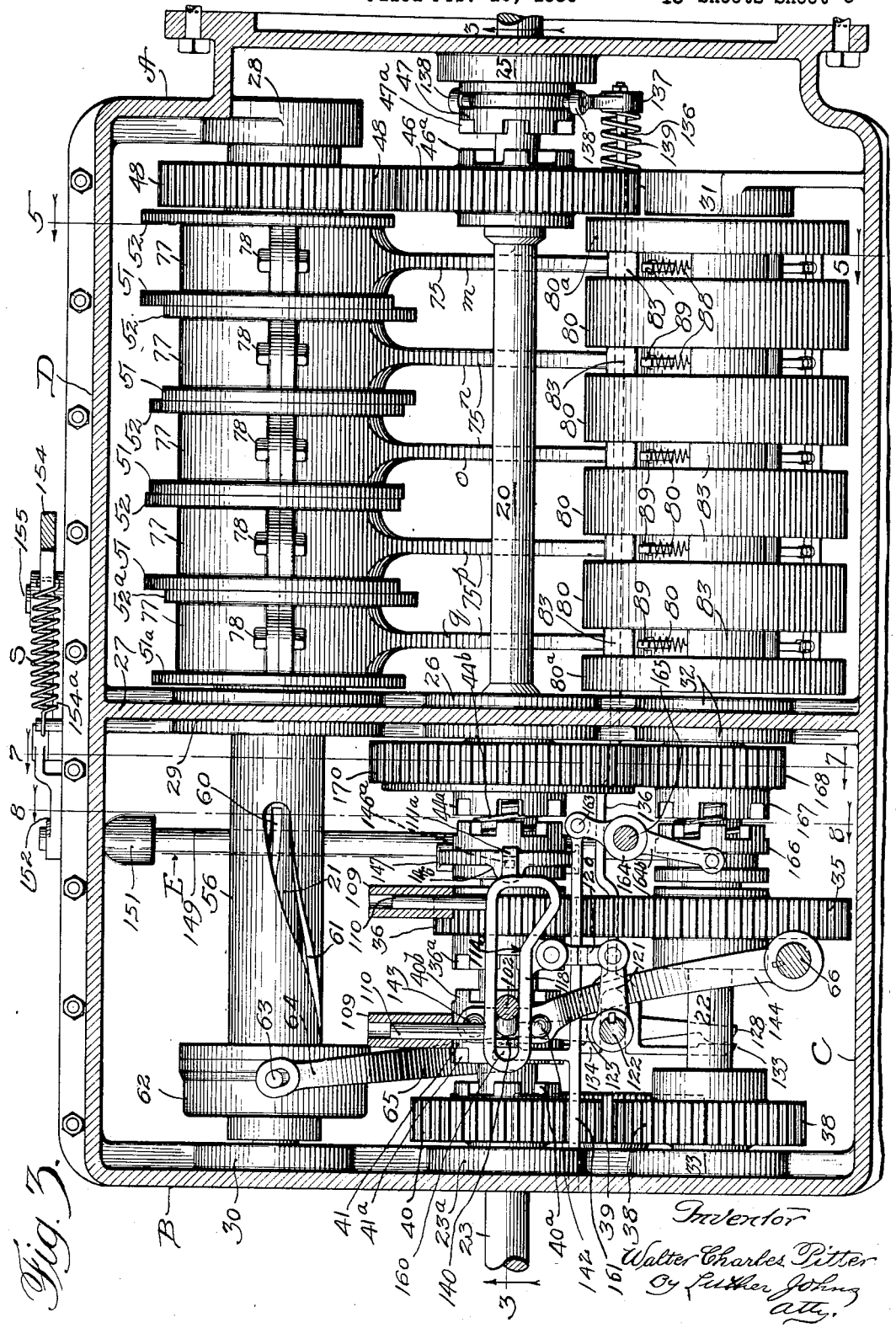
Fig. 3 is a top plan with the upper wall of the casing removed.

Turning to Fig. 4 we see a plurality of pitmen or connecting rods 75 which are indicated individually as $m$, $n$, $o$, $p$ and $q$. In Fig. 6 these five pitmen are shown in their relative positions when the cams have their maximum eccentricity. In Fig. 5 we see them all alined in the neutral or non-operative position. All of these cam pitmen or connecting rods are alike. Each of them has a band or strap 77, shown divided diametrically and with the two halves held together by extending flanges and a bolt at 78 (Fig. 3). The straps 77 pass around the periphery of the outer cams 49 on the surfaces 50 thereof. The operation of the cams is therefore to reciprocate the pitmen 75.

We turn now to the mechanism on the clutch shaft 22.

Note from Figs. 4 and 5 that there are four double-faced circular driven members 80 keyed at 81 to shaft 22, and two single-faced driven members 80a keyed at 81 also to the shaft. The driven members 80a are spaced apart, and between them, loosely mounted on shaft 22, are driving members 82, each of them carrying three rocking, tiltable or canting clutch elements or grippers 83 (see Fig. 5), the same operative against the concentric facing inner sides of an annular groove or recess 84 in each one of the adjacent driven members 80. That is to say, each gripper 83 operates with two of the driven members 80. The shape of these grippers 83 is shown in Fig. 5 from which it will be observed that if they are canted in the grooves 84 they will become bound tightly therein. This desired canting is effected through links 85 pivoted at 86 to the respective ends of the dogs or grippers 83 and to the driving member 82 at 87. It will be noted that at 87 the links 85 are seated in a circular recess to take the thrust, and a similar construction preferably occurs also at 86. The tension spring 88 attached to an arm 89 and to the end of each gripper 83 tends to preserve the grippers in their desired attitude for being moved into gripping relation, and, on cessation of the gripping action, to restore the grippers for another application of the power.

Rocking movements are communicated to the driving members 82 by the pitmen 75 pivotally mounted at 90 to these driving members respectively.

Looking at Fig. 5 if we assume the pitman 75 to be moved to the right the driving member 82 will be moved counter-clockwise as shown by the arrow. A radial thrust at once occurs upon the links 85. This radial movement is exceedingly slight and could be so slight as scarcely to be noticed. Its effect is at once to cant the dogs or grippers 83, binding them in the groove 84, and then the driving force is communicated through the links and grippers to the outer or driven member 80 which, as stated is keyed upon shaft 22, and thus the shaft 22 is turned a distance or amount proportional to the reciprocating movement of the pitman 75. Now as there are five of these pitmen and five of the cooperating clutch mechanisms, and as the clutch mechanisms are operated successively, we have a succession of pulls upon the driving members 82, and the arrangement is such that before the pulling stroke of one pitman has ended the pulling stroke of the next in series has begun, so that the movement of the clutch shaft 22 is continuous, and it is also regular except for minute variations which occur due to arcuate movements of some of the parts. Since the driving members 82 are loosely mounted on the shaft 22 and since these clutches are one-way devices, acting after the manner of ratchets and pawls, the return stroke of the pitmen 75 for a new grip is entirely free, and on these return strokes the driven member 80 is entirely free-running in the forward direction so far as any individual one of them is concerned. Such one-way clutch devices are sometimes referred to as one-way mechanical valves, since they permit driving force to pass through them only in one direction.

This clutch device illustrated is of my invention and is the subject matter of a copending application for Letters Patent of the United States filed as Serial No. 293,593 on July 18, 1928, entitled Clutches, and is here referred to for further elucidation of the clutch feature, should same be desired.

It has been shown hereinabove how the variable speed of clutch shaft 22 is communicated to the output shaft. In some applications the clutch shaft may be the output shaft.

I turn now to the means for controlling the operations.

Figure 9:
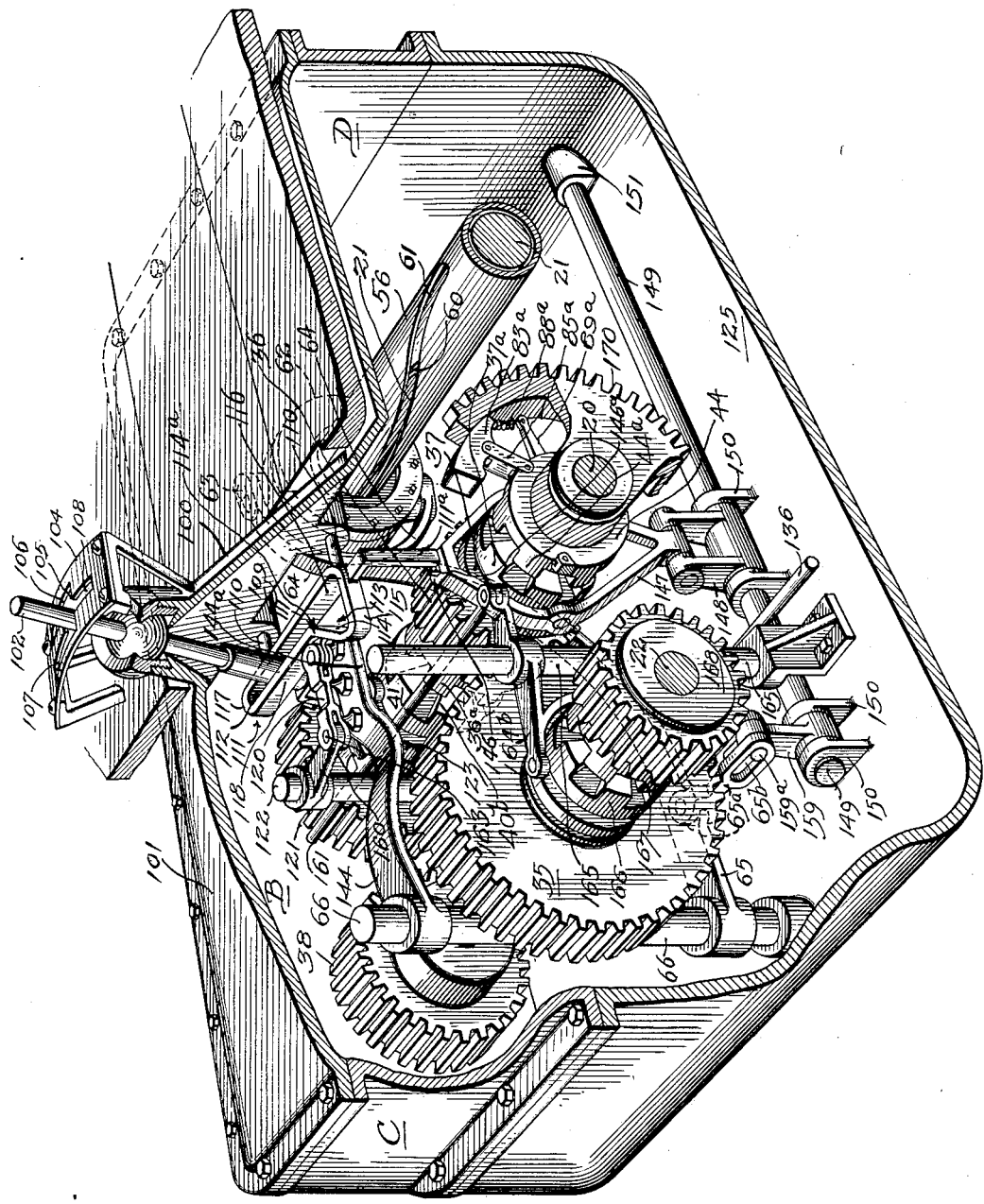
Fig. 9 is a perspective of various of the control mechanisms.

Turning to the perspective of Fig. 9 we note that emerging through the floor of the automobile is a hollow standard 100 which is integral with the removable cover 101 of the casing (Fig. 8). A hand-control lever 102 has a ball-and-socket connection 103 with the standard. A guide plate 104 covers the flaring top part of the standard at a substantial distance above the universal rocking connection 103.

The guide plate 104 has a transverse slot 105 which opens into two longitudinal rearwardly-directed parallel slots 106 and 107, the latter being shorter than the former to limit the lever movement. Cross slot 105 also opens into a central forwardly-directed short slot 108. The hand lever 102 projects through and may be moved about in this guide slot formation.

Beneath the housing cover 101 and integral therewith, and directly below the standard 100, are two transversely directed lugs 109, 109 bored to receive for sliding movements the parallel rods 110, 110. These rods carry rigidly a hollow continuous frame 111 open at top and bottom and shaped as shown in Fig. 3 to define a longitudinally-directed slot 112 opening into a space 113. The elongated ring 111 is defined by a laterally-slanting side wall 114, a front end wall 115, the side wall 116, the rear end wall 117, and the side wall 118 parallel with wall 116.

The lower end portion of the control lever 102 extends through the hollow interior of this frame 111, and the frame will move laterally, while being guided and supported by rods 110, whenever the upper part of the hand lever is moved laterally in the cross guide slot 105, which cross slot, I may mention, defines the neutral position of the control lever. When the lever 102 is moved longitudinally in any of the guide slots 106, 107 and 108 the lower portion of the lever moves longitudinally in the hollow frame 111.

With the hand lever 102 in the midway or neutral position shown in Figs. 3, 5, 8 and 9 the top of the hand lever may be moved to the right or to the left in cross slot 105. Let us assume it to be moved to the right in Fig. 8. In Fig. 9 this would be toward the upper edge of the sheet and slightly toward the right. That movement causes the hollow frame 111 to be moved bodily farther away or outward from the lugs 109, or to the left in Fig. 8, the distance being determined by the end of the slot 105. The position is shown by full lines in Fig. 13. This outward movement of frame 111 is for coupling the parts so that the output shaft will run in the same direction as does the input shaft, which is the coupling for forward driving, and on that preliminary lever movement this is what takes place: The link 120 connected at one end to frame side wall 118 and at its other end to lever 121 pushes the end of that lever 121 rigid with vertical shaft 122, and rocks that shaft 122. Another lever marked 123 is also fixed on shaft 122 and carries a yoke 124 (see Figs. 4 and 8) connected with double-faced clutch 41 on the output shaft 23, and the preliminary hand-lever movement described moves this clutch 41 to the right as viewed in Fig. 4, thereby locking pinion 36 to output shaft 23. Since pinion 36 is driven by gear 35 on clutch shaft 22 we see that merely moving the control lever laterally from its neutral position connects the output shaft with the variable-speed shaft.

Figure 1:
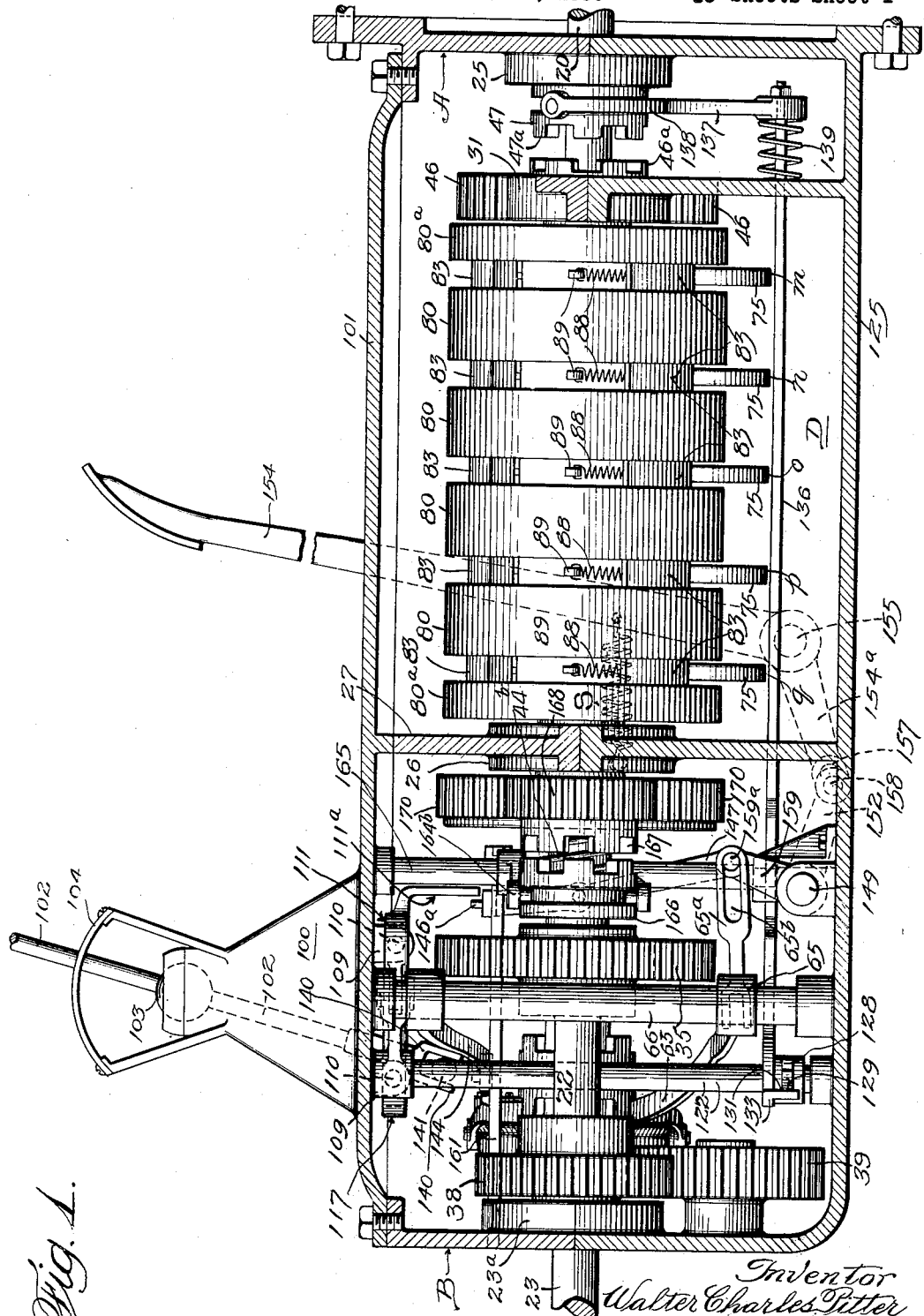

Vertical shaft 122 is pivoted in the bottom wall 125 and in top plate or cover 101. Near the bottom of shaft 122 (see Fig. 16) there is a bar 128 secured rigidly at its middle to this shaft 122. Rounded contact faces 129 and 130 at the ends of bar 128 are adapted to bear against flat faces 131 and 132 respectively at the ends of arms 133 and 134 which terminate in a yoke 135 encompassing shaft 122 with a snug sliding fit. From yoke 135 extends a rod 136 (see Figs. 1, 3 and 4) leading to yoke arm 137, which yoke arm carries a clutch yoke 138 for operating the clutch 47 at the front end of input shaft 20.

A compression spring 139 (Figs. 1, 3 and 4) between yoke arm 137 and the front wall of the housing tends to move clutch 47 out of engagement. This same spring 139 exerts such a pull upon rod 136 as to tend to maintain the contact faces 131 and 132 into engagement with the opposed ones 129 and 130 on bar 128 (Fig. 16). The spring 139 therefore tends to maintain the vertical shaft 122 in what is the neutral position. Any movement of hand lever 102 to right or left in neutral guide slot 105 rocks shaft 122 against the tension of spring 139, since such rocking movement tilts bar 128 in one direction or the other. Whatever the direction of such tilt may be, one or the other of the faces 129, 130 will operate to push the yoke member 133, 134, 135 so as to effect a pull upon and movement of rod 136, putting spring 139 into compression. Rod 136 must move in straight lines because it is slidably mounted in partition wall 27 and in the front wall A of the housing.

I have mentioned that when vertical shaft 122 is rocked in one direction, the clutch shaft 22 is made to drive the output shaft 23. We now see that that same rocking movement of vertical shaft 122 simultaneously connects clutch 47 with gear 46 at the front end of the device. This last-mentioned connection puts the cam shaft into operation. Owing to the construction shown in Fig. 16 that cam shaft 21 is put into operation by moving the hand lever 102 either to the right or to the left in cross slot 105. The reason for this provision is that moving the hand lever 102 to the right as viewed in Fig. 8 connects the parts for forward driving while moving it to the left connects the parts for reverse or rearward driving, and in either event, by the act of selecting and connecting up for driving the output shaft 23 in either direction the power is thus simultaneously connected to the cam shaft.

I have described hand lever 102 as having been moved to the right as viewed in Fig. 8 in guide slot 105 to connect the mechanism up for forward driving. The cam shaft 21 is now running, but the cams are still in neutral and the output shaft is standing still. When the operator now draws the hand lever rearward in long guide slot 106 the eccentricity of the cams is increased from zero or neutral to their full throw, giving a gradually increasing speed to the output shaft, and I shall now explain how this happens.

Figure 2:
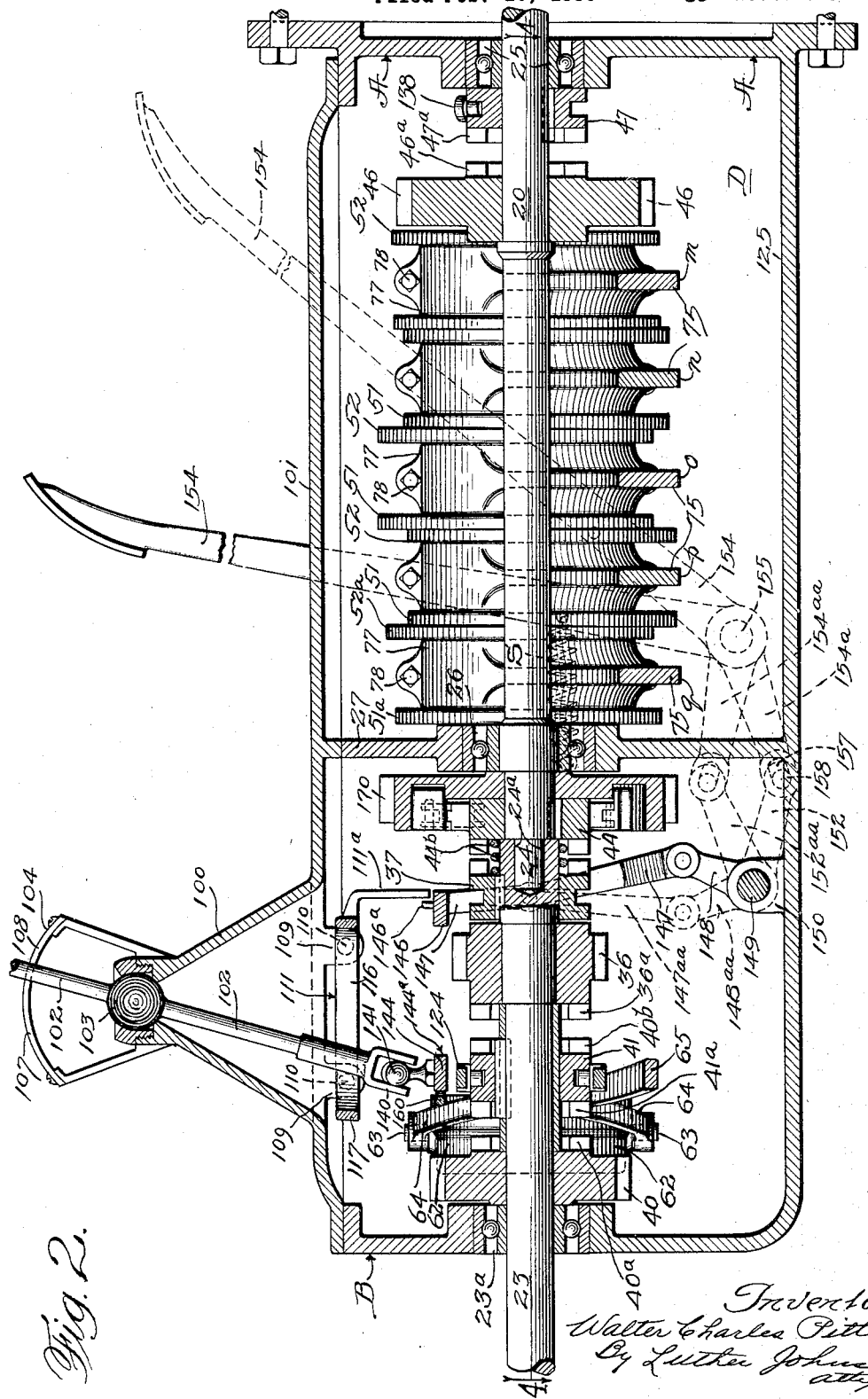
Fig. 2 is a medial vertical longitudinal section through the device, as on the line 3—3 of Fig. 3.

Note first Fig. 2 which shows that at the bottom of hand lever 102 there is a rigid yoke 140. Fig. 8 shows this yoke engaging the middle or neutral one 141 of three ball-topped studs, the other two being marked 142 and 143. They are arranged in a line straight across and are rigidly secured to a flat section 144a of a lever arm 144 secured to vertical shaft 66 pivoted in the top and bottom walls of the housing. The yoke 140 will engage ball 142 when the top of the lever 102 is moved to the right as viewed in Fig. 8, and will engage ball 143 when moved in the opposite direction from the middle or neutral position.

The lever arm 144 is moved in the same common forward direction whichever ball 142 or 143 is selected, and it is unnecessary to consider which one is in use for either forward or reverse movement of the output shaft 23, its being sufficient that one of them be so engaged. The yoke 140 is wide enough to allow for the arcuate movements of the ball 142 or 143 on their respective arcs centering in shaft 66.

We may now return to the place in the description where the operator begins to draw the hand lever rearward in long guide slot 106. Such rearward movement moves the free end of lever arm 144 to the right as viewed in Fig. 3, rocking shaft 66 clockwise. Fig. 8 shows that yoke arm 65 is also rigidly connected to shaft 66. Fig. 9 shows that a clockwise movement of vertical shaft 66 will swing arm 65 to move the housing 62 to the right on cam shaft 21, the effect of which has been described, namely that the sleeve 56 having a twisted slot is turned and the cams are thereby made more and more eccentric. We now have a gradually increasing speed of the output shaft.

Now let us consider what happens when the manual control lever 102 is at a place almost all the way back in guide slot 106. A place is reached near the rear end of slot 106 at which the lower end of the lever comes to point 114a on the elongated frame or ring 111. At that time the stud shaft 70 (see upper left hand corner of Fig. 4 and Fig. 14) has reached about the line marked E in Fig. 4, and this movement has developed substantially the maximum throw of the cams. At the same time lever 144, at its three-ball end 144a, has just come into contact with a rounded projection 146 (Figs. 2, 3 and 9) at the upper end of a yoke 147 operating the clutch 37 on the output shaft.

The lower end of this yoke 147 (Fig. 9) is pivoted to a short lever arm 148 secured to a transverse shaft 149 journaled in projections 150 and 151, and this shaft 149 extends through side wall D of the housing (see Figs. 4 and 5). Outside the housing a lever arm 152 is rigid with shaft 149. The foot lever 154 (Fig. 2) is a lever of the first class with its bearing on the stud shaft 155 (Fig. 5) secured in a lug 156 near the bottom of wall D of the housing. The short arm 154a of the pedal lever has an elongated opening 157 in which is a pin 158 carried by the bifurcated end of lever arm 152.

Returning now to our assumed position, with the output shaft rotating substantially at its highest speed derivable from clutch shaft 22, hand lever 102 is at 114a (Fig. 9), the three-ball lever end 144a is contacting projection 146, and the control for the cams has developed about their maximum eccentricity. We shall now pull the hand lever 102 a little farther back in guide slot 106 and connect the output shaft directly to the input shaft, while cutting out the variable speed mechanism, so that we may have a simple straight-through drive for the great bulk of the work.

In this connection I should mention that when the cams have reached this maximum eccentricity the output shaft is rotating one to one with the input shaft. The clutch shaft is rotating at half the speed of the output shaft, but the two to one gears 35 and 36 step up the output speed. When we go from the variable-speed drive into the direct straight-through drive the input shaft and the output shaft are running at the same speed, and they may therefore be clutched together in an entirely convenient and satisfactory way. I should add, however, that just before this actual clutching takes place—that is when the movable clutch member is still a small distance away from its coacting member—the output shaft speed is a trifle less than that of the input shaft, and so the clutch members move slowly relative to each other to the extent of this speed differential. This makes the clutch members automatically "feel" for their actual clutching orientation with respect to each other.

The action of the parts on this final or rear-end movement of hand lever 102 in guide slot 106 is as follows:

The further advancing movement of the three-ball end 144a of lever 144 pushing against projection 146 moves the single-face clutch member 37 (Figs. 4 and 9) into engagement with clutch member 44 on the input shaft, and this is against the tension of a coiled spring 44b (Figs. 2 and 4). This connects input shaft 20 directly with output shaft 23. While this is taking place the lower end portion of hand lever 102 is moving along the long wall 116 of the elongated ring 111 (Fig. 9) at a place opposite the slanting side 114. Since the tension of spring 139 (lower right hand corner of Fig. 4) is being exerted to force the ring or frame 111 to the right as viewed in Fig. 9 (we will recall that this ring 111 was moved to the left in Fig. 9 on the first movement of the hand lever) the slanting wall 114 permits the ring 111 to be moved to the right in Fig. 9, or back into the neutral position, so that, as a matter of fact, the slanting wall 114 keeps in contact with the lower end of the hand lever 102 during this final movement of the hand lever, and the frame 111 is finally moved inward (toward the lugs 109) to such extent that the lower end of the hand lever is in the corner of the space at arrow-pointed lead line 113. When the frame 111 thus moved inward vertical shaft 132 was rocked in the counter-clockwise direction, which moved clutch lever 123, which withdrew clutch face 40b of clutch 41 (Fig. 4) from clutch face 36a on gear 36. We now, by this last-mentioned movement, have output shaft 23 declutched from driven connection with the variable speed mechanism.

When the parts are thus connected for direct drive it is desirable to lock them releasably in that position since the tension of the coiled spring 44b associated clutch 44 (Fig. 4) tends to declutch the output shaft from the input shaft. In Figs. 2 and 13 will be seen a downwardly-extending stop 111a. It is shown in Fig. 13 at the front wall 115 of the frame 111. That frame 111 is in the changed position in Fig. 13 which resulted from moving the hand lever in the neutral slot 105 preparatory to its movement in slot 106. The projection or stop 111a has therefore been moved to its full line position in Fig. 13 from its dotted-line neutral position at 111aa in that figure, and the position at 111aa is also the position of this stop when the frame 111 automatically went back into its neutral position when the output shaft was clutched directly to the input shaft.

Now note from Fig. 2 that there is a catch projecting upward as a finger from the projection 146. This catch is shown at 146a in Fig. 13 and its changed position in the same figure is shown at 146aa, and this changed position resulted from its being pushed forward by the three-ball end 144a of lever 144. It will be noted from Fig. 13 that it has moved from left to right in Fig. 13 on a straight line forward. At the time it was moved as just described the stop 111a was in its full line position in Fig. 13 so that there was no interference between these two when the stop 146a went into its changed position at 146aa. Now, however, on reaching that 146aa position the conditions became such that the frame 111 moved back to neutral, and in doing so the stop 111a came into its dotted-line position at 111aa, in blocking relation to the catch, and since catch 146a (in its 146aa position) may not now move to the left in Fig. 13 the clutch 37 may not move away from clutch 44, and thus the output shaft may not become disengaged from the input shaft. We shall see that when the operator desires to declutch the input shaft from the output shaft, either by the hand lever or by the foot lever, he may do so.

Let us first consider what happens when the hand lever 102 is moved forward, or toward the neutral slot 105 in the guide slot 106. We have pointed out that at such time the ring-like frame 111 has automatically gone back into the neutral position, with its slanting wall 114 ready to be engaged by the lower end of the hand lever in the reverse movement of the latter. The dotted-line position of the wall 114 shows its relation to the hand lever 102 when the hand lever is about to be moved to the left in Fig. 13. Such lever movement moves the frame 111 again into its full-line position in Fig. 13, because of the slanting or cam surface of the wall 114. This outward movement of frame 111 does everything that was done by the original movement of the hand lever in guide slot 105, namely it clutches the variable speed mechanism to the output shaft and re-clutches the input shaft with the cam shaft at the front-end clutch 47 in Fig. 3. This same outward movement of the frame 111 draws stop 111a away from opposition to catch 146a in its 146aa position, and the coiled spring 44b declutches the input shaft from the output shaft. Likewise the throw of the cams is reduced slightly in the first initial movement, so that when this reclutching and declutching operation is completed the output shaft is again under the control of the variable speed mechanism and is rotating a little below one to one with the input shaft. By this time the lever is at the bend 114a (Fig. 13), and through the rest of the forward movement of the upper end of the hand lever in guide slot 106 (Fig. 13) toward the neutral slot 105, the speed of the output shaft is gradually being reduced, and when the hand lever has reached neutral slot 105 the output speed is again zero. The operator does not have to move the hand lever to the central neutral position as this automatically takes place through the force of compression spring 139 (lower right hand corner of Fig. 4).

We will now return to the declutching operation in connection with the pedal. The input shaft 20 is again to be considered in direct drive with the output shaft 23, and the hand lever is still standing completely pulled back in slot 106. The foot lever 154 being depressed (see Fig. 2) its lever extension 154a is thrown upward into its dotted-line position 154aa and the lever 152 is moved into its dotted-line position marked 152aa while lever 148 is moved into its dotted-line position 148aa. This moves the lower end of the yoke 147 into its dotted-line position 147aa. We moved the upper end of this yoke 147 to the right in Fig. 2 for a clutching operation and now by means of a pedal we are moving the lower end of the yoke to the left for a declutching operation. In the clutching operation the lower end was held under the tension of a spring S which normally holds the pedal raised. We must now see that there is a fulcrum for the top of the yoke 147 if we are going to move it at the bottom for declutching.

This upper fulcrum of yoke 147 is the catch 146a in its 146aa position. The coiled compression spring 44b associated with clutch 37 maintains the catch 146a against the stop 111a in the 111aa and 146aa position of Fig. 13a. There is really no fulcrum for power derived from the pedal; and depressing the pedal 154 does not actually force the yoke 147 to the left as viewed in Fig. 2. What it does is to move the lower end of the yoke to the left in Fig. 2 and thereupon the coiled spring 44b, which is operating between the upper and lower ends of the yoke, pushes the clutch member 37 out of engagement as rapidly as the movement of the lower end of the yoke will permit. The upper end of the yoke is constantly being maintained against the stop 111a, so that that stop is the fulcrum for the yoke when operating as a lever of the third class with the power (spring 44b) applied intermediate its ends.

Now when the pedal is released and returns under the force of spring S to upright position the stop 111a becomes the fulcrum for the yoke operating as a lever of the second class with the power applied at one end and the weight intermediate the ends.

For merely this declutching operation the clutch pedal will be depressed only a short distance. When letting the foot pedal come back for reclutching the input shaft directly with the output shaft, after merely throwing the clutch out, the operator may desire to increase or decrease the speed of his engine somewhat to bring the input speed close to that of the output speed. I have provided means, however, for rendering the reclutching operation more satisfactory, and to give other advantages also. Note from Fig. 9 that a lever arm 159 is mounted on pedal shaft 149. A link 65a pivotally connected to lever arm 65 has an elongated slot 65b in which slides a pin 159a on lever 159. When the pedal is partially depressed the pin 159a travels freely in slot 65b and when the end of that slot is reached a further depression of the pedal moves lever arm 65 counter-clockwise in Fig. 3, and this moves the casing 62 on the cam shaft 21 in the direction which would be employed for reducing the speed of the speed-varying mechanism. That speed-varying mechanism is idle at this time, clutch 47 being disengaged. Rocking shaft 66 as indicated moves lever 144 back and this carries the bottom of hand lever 102 back, restoring frame 111 to its forward driving position, and, through the mechanism connected with frame 111 the output shaft is reconnected to the clutch shaft. At the same time the three-ball end 144a of lever 144 is drawn away from projection 146. In brief, the action of the pedal when forced down its full distance is first to declutch the input shaft from the output shaft and then to restore the hand lever and other parts to initial speed-varying position, so that on letting the pedal come back nothing happens except that its own devices are restored for another action, and the operator simply draws the hand lever first a little to the side in slot 105 and then back again in slot 106. The operator may depress the foot lever at any stage and restore the hand lever to neutral. This will often be simpler and quicker than moving it back by hand and it always results in a smooth and easy reconnection of the vehicle with the driving power.

I may also point out, as will be obvious to those skilled in the art, that with the present transmission installed the ordinary friction clutch may still be employed in the automobile, in which event the input shaft 20 may follow the ordinary friction clutch, and in such an application the herein-shown pedal control would naturally be omitted. In this respect, therefore, the builder of the automobile may decide for himself which type of clutch he will employ, and if he should employ the ordinary or any approved type of friction clutch it would be entirely without prejudice to the operation of the rest of the mechanisms forming the chief subject matter of this specification.

Let us now consider the movements of the control mechanism when it is desired to reverse the rotation of the output shaft.

For reversing we start at neutral as shown in Fig. 8 and first move the hand lever to the left as viewed in that figure in neutral slot 105. This moves frame 111 (Fig. 9) inward or to the right and moves vertical shaft 122 counter-clockwise. The yoke device 135 and its several parts associated with shaft 122 operates rod 136 to clutch the input shaft with the cam shaft as already described. The yoke lever 123 is moved from its neutral position so that the double-faced clutch 41, Figs. 2 and 4, is moved to the left as shown in those figures and the loose pinion 40 on output shaft 23 is thus made fast with shaft 23. Through the idler 39 and driving gear 38 on the clutch shaft 22 the output shaft 23 is put into reverse motion. The operator may now draw the hand lever 102 back in the shorter guide slot 107.

This movement controls the speed of the clutch shaft the same as when the hand lever is in slot 106 and it is unnecessary to go through that description again. Ordinarily it is not desirable to run in reverse as rapidly as in the forward direction so that the slot 107 is shown as being relatively short whereby the wall defining the end of it will act as a stop for the hand lever when the output shaft has been accelerated to some intermediate degree between zero and high. When the movement of the hand lever is blocked at the end of slot 107 it will be of course impossible to go into the higher speeds or to connect the input shaft directly with the output shaft; but it will be obvious that by simply making the slot 107 as long as slot 106 we may have these higher speeds and also the direct connection with the output shaft if, in addition we modify the shape of the ring-like frame 111 so as to provide a slanting surface such as at 114 directly opposite the surface 114 shown for the purposes pointed out in connection with that wall 114.

I have provided means for getting the benefit of a speed-resisting engine compression for use in cases where the vehicle is, for example, going down hill and a certain braking action or resistance is desired. When the output shaft 23 is connected directly to the input shaft we have engine compression of that type.

The means now to be described provide for engine compression when the mechanism is in neutral. That neutral condition is one which would be used when the engine is going down hill and the hand lever is thrown forward into its middle poition as shown by Figs. 8, 9 and 17. If the hand lever be moved from neutral forward to the end of the short forwardly-directed slot 108 the lower end of the hand lever is of course moved rearward. Figs. 2 and 3 show hand lever yoke 140 engaging the middle ball 141 in the neutral position. Fig. 8 makes clear also that if that yoke 140 be moved away from the viewer, or to the left in Fig. 2, the lever arm 144 will be moved to rock shaft 66 in a counter-clockwise direction. The rear edge of the three-ball end 144a of lever 144 is against an arm 160 (Figs. 3, 8 and 9) which is connected to a bar 161 which is slidably mounted in the end wall B of the housing at one one end and at the other end is pivoted at 163 to the short end 164a of a lever 164 of the first class secured on a vertical shaft 165 and mounted in the top and bottom walls of the housing. The longer arm 164b is a yoke for controlling the clutch member 166 adapted to engage with the cooperating clutch member 167 on the pinion 168. The clutch members 166, 167 and pinion 168 are on the clutch shaft 22 and as the clutch member 166 is splined for sliding movements on that shaft the interclutch locks the pinion 168 for rotation by the clutch shaft.

Figure 7:
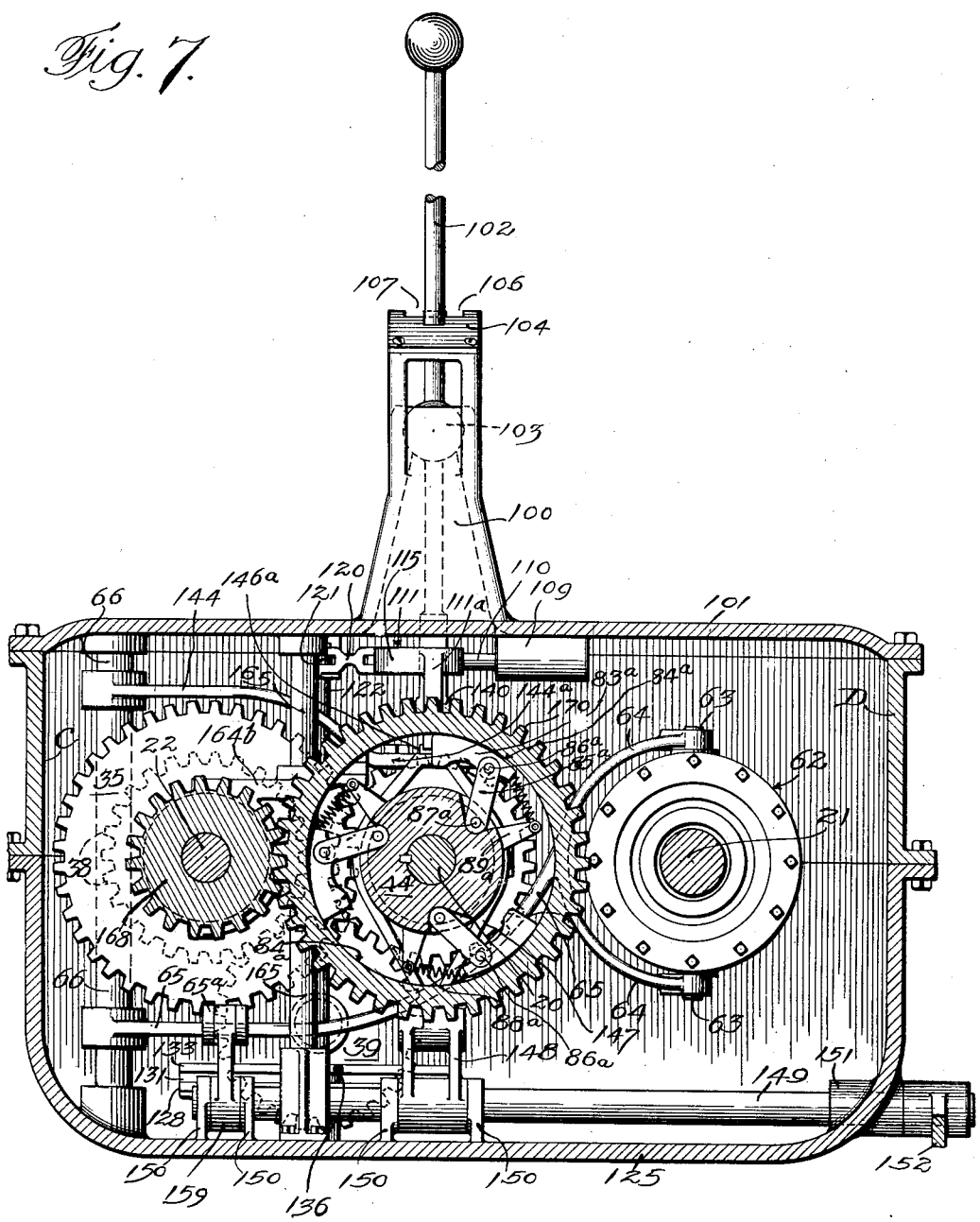
Fig. 7 is a vertical section on the line 7—7 of Fig. 3.

Intermeshing with pinion 168 is a gear 170 which is loosely mounted on input shaft 20 (see Fig. 4). The sectional view of Fig. 7 shows that this gear 170 is on the periphery of a driven member in all substantial respects like the driven member 80 (Fig. 5) of any one of the series of those one-way clutches. Because of the similarity between the clutch now being described and that shown in Fig. 5 the several parts of it will be similarly numbered with the addition of a small letter *a*. The clutch groove is therefore marked 84a, the grippers 83a, the links 85a, the springs 88a, their supports 89a, and the inner driving member secured to the input shaft has already been identified as a collar 44 in connection with prior description. It is pointed out that the one-way clutch having the gear 170 operates in the same direction from those shown in Fig. 5, so that parts appear in the same relation. When the input shaft is connected directly to the output shaft the inner hub or driving member 44 is of course being rotated and therefore must run freely in that direction. When the vehicle is driving the engine, however, the power comes in through pinion 168 to gear 170 and if the engine speed be lower than that of the vehicle speed as interpreted by the output shaft the grippers 83a become effective to turn the input shaft in its normal direction of movement, thus causing the pistons of the engine to reciprocate and provide a compression which retards the movement of the output shaft, which is delivering the driving power at such time. I should mention also that in using this compression the operator maintains his hand on the hand lever holding it forward in the short slot 108. As soon as he releases the hand lever the compression spring 173 associated with clutch elements 166 and 167 forces those clutch elements apart and this same movement is communicated back to bar 160, Fig. 3, which forces the hand lever back to neutral; and I may mention here also that this bar 160 is normally in such a position as to guide the hand lever 102 at an open end of the slot 108 so that there is no interference by slot 108 with the movements of the hand lever in shifting from one side to the other. In order to get into slot 108 the hand lever must be in its middle or neutral position with respect to the guide plate 104; and I may mention again that the mechanism shown in Fig. 16 and the spring 39 (lower right hand corner of Fig. 4) normally keeps the hand lever balanced in that intermediate neutral position.

Figure 18:
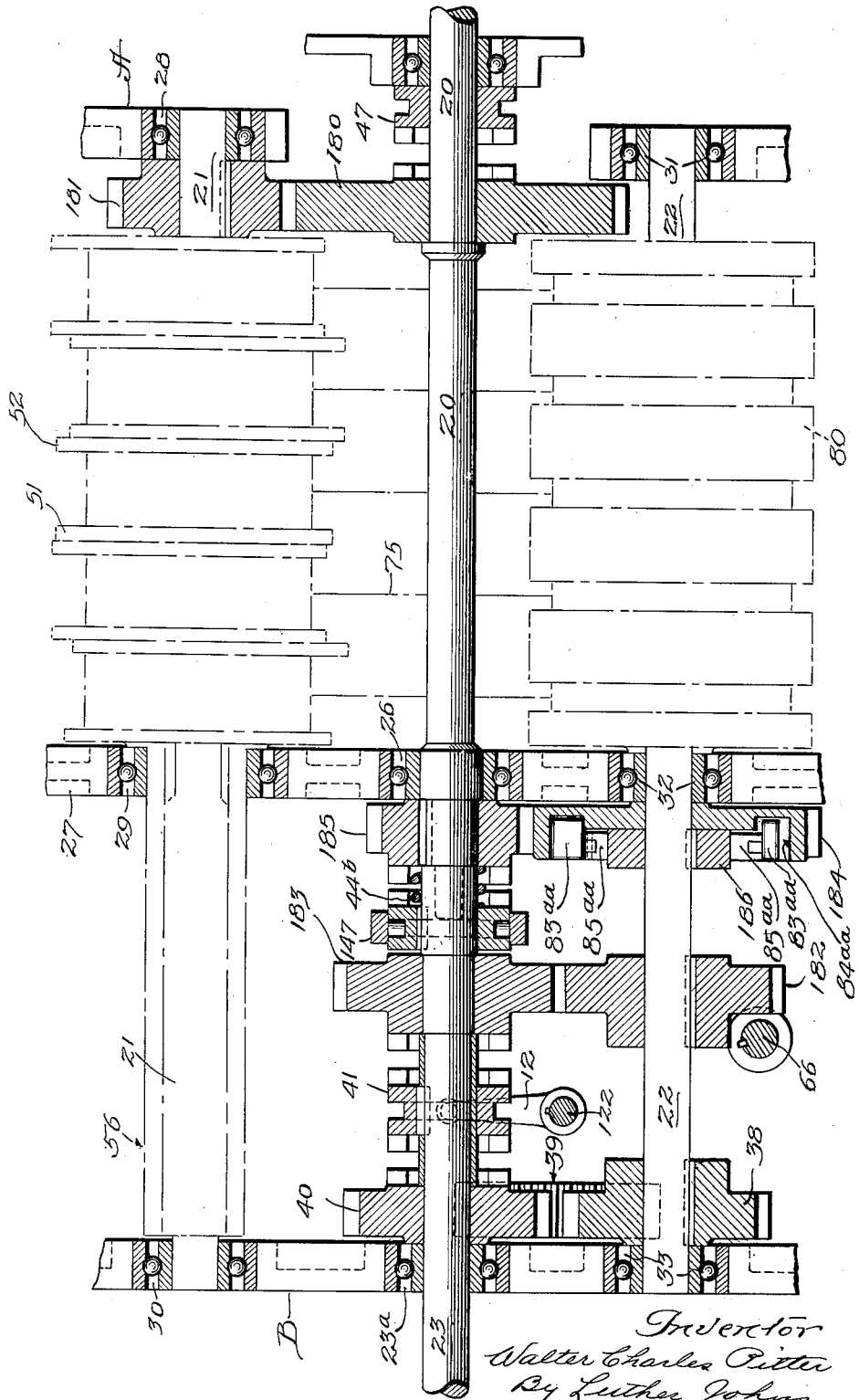
Fig. 18 is a fragmentary horizontal section showing a modification.

In Fig. 18 I have fragmentarily shown a modification which follows the sectional plan of Fig. 4. The device of Fig. 18 is to be considered like that of Fig. 4 as to everything but the specific changes next hereinbelow indicated, and so I have omitted from Fig. 18 many details unnecessary to the present description. Fig. 18 is directed to means whereby a greater amount of speed-retarding engine compression is obtained when the vehicle is running at a rate which drives the output shaft 23 faster than the speed of the input shaft 20.

Describing Fig. 18 to the extent necessary, and using the same reference characters for parts which are the same as those in the preferred form, on input shaft 20 is a gear 180 meshing with a pinion 181 on cam shaft 21 rotating the cam shaft two-to-one with the input shaft instead of one-to-one as in Fig. 4. On clutch shaft 22 the driving gear 182 is of the same size as driven gear 183 on output shaft 23, instead of being at two-to-one ratio as in Fig. 4. The clutch gear 184 instead of being on the input shaft 20 as in Fig. 4 is here on clutch shaft 22, and the pinion 185 meshing with clutch gear 184 is fixed on the input shaft. The clutch 166—167 of Fig. 4 is here omitted. The one-way clutch mechanism 186 with parts marked 83aa, 84aa and 85aa may be considered the same as in the one shown in Fig. 7, and does not need further description. Now since the speed of clutch shaft 22 and cam shaft 21 are double that shown by the construction of Fig. 4, due to the two-to-one ratio of gears 180—181, under vehicle-driving conditions, the speed of the output shaft 23 is one-to-one with the input shaft 20, the same as with the device of Fig. 4. However, when the vehicle is driving the engine, according to Fig. 18, since clutch gear 184 is twice as large as its driven pinion 185, input shaft 20 is rotated twice as fast as is the output shaft. Gear 184 and pinion 185, being always in mesh, are rotated all the time input shaft 20 is running, but the clutch 186 is free running when the rotating power is applied to gear 184 while being adapted to bind and become a clutch when the power is applied to the inner driving member 186, which occurs when the vehicle is driving the engine.

This clutch device is therefore automatic in its action and comes into play instantly the vehicle moves faster than it is actually being driven by the engine.

Figure 19:
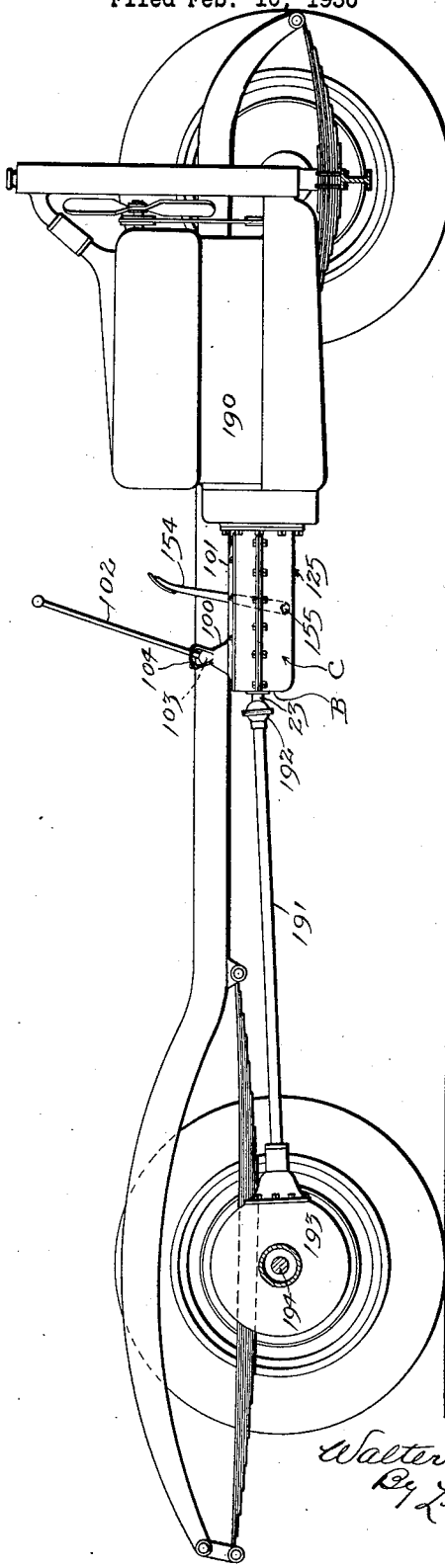
Fig. 19 is a view showing the application of the device to an automobile.

In Fig. 19 the input shaft will be understood to be connected directly with the driving shaft of the engine 190. The output shaft 23 and the automobile drive shaft 191 are connected by a universal joint 192. The differential 193 drives the rear wheel axle 194. It will be noted that my novel transmission device has merely been substituted for the one ordinarily found at the same place in the automobile arrangement, and that everything else may be as usual or as preferred.

I claim:

1. In a variable speed transmission, the combination of an input shaft, an output shaft, a cam shaft, a clutch shaft, a multiple cam and clutch mechanism connecting said cam shaft and clutch shaft, a hand lever, means operable upon movement of the hand lever in one direction for establishing driving connection between said cam and clutch mechanism and the output shaft through the clutch shaft, and means operable upon movement of the hand lever in a direction at right angle to the first named direction for varying the speed of the output shaft, said last named means being operatively connected with the cam shaft.

2. In a variable speed transmission, the combination of an input shaft, an output shaft, a cam shaft, a clutch shaft, a multiple cam and clutch mechanism connecting said cam shaft and clutch shaft, a hand lever, means operable upon movement of the hand lever in one direction for establishing driving connection between said cam and clutch mechanism and the output shaft through the clutch shaft, means operable upon movement of the hand lever in a direction at right angle to the first named direction for varying the speed of the output shaft, said last named means being operatively connected with the cam shaft, and means operable upon continued movement of the hand lever in the last named direction for interrupting the driving connection between the clutch shaft and the output shaft and for directly connecting the output shaft to the input shaft.

3. In a variable speed transmission, the combination of a rotatable input shaft, a rotatable output shaft, means including a speed varying cam setting and clutch mechanism for driving the output shaft from the input shaft with gradually increasing and decreasing speeds in the output shaft relative to the speed of the input shaft, means including a hand lever for operatively connecting the output shaft to said speed varying clutch mechanism, means including the same hand lever for controlling the speed of the output shaft through said speed varying cam mechanism, means including the same hand lever for connecting the input shaft to the output shaft, and for disconnecting said last named shafts, a foot lever, and additional means under control of the foot lever, independent of said hand lever for disengaging the input shaft from the output shaft.

4. In a variable speed transmission, the combination of a rotatable input shaft, a rotatable output shaft on the axis of the input shaft, speed-varying means comprising a separate cam shaft and a clutch shaft parallel to each other and to the other shafts, and means for connecting the input shaft to the output shaft to drive the latter at gradually increasing and decreasing rates of speed, and means for substantially simultaneously connecting the input shaft directly to the output shaft and for disconnecting the output shaft from said clutch shaft when the clutch shaft is operating to drive the output shaft at substantially the highest rate of speed obtainable through actuation of said clutch shaft from said cam shaft.

5. The combination of claim 4 hereof in which said means for substantially simultaneously connecting the input shaft directly to the output shaft and for disconnecting the output shaft from said speed-varying means include a single hand-operable lever and a universal joint mounting for the same within the transmission.

6. The combination of claim 4 in which said speed-varying means and said means for substantially simultaneously connecting the input shaft to the output shaft and for disconnnecting the output shaft from said speed-varying means include a single manual control.

7. The combination of claim 4 hereof in which there are also means for reversing the direction of the output shaft.

8. The combination of claim 4 hereof in which there are also means for reversing the direction of the output shaft and there are control means including a single hand lever for controlling the speed-varying mechanism, the reversing means, and also the means for substantially simultaneously connecting the input shaft directly to the output shaft and for disconnecting the output shaft from said speed-varying means.

9. A variable speed transmission, comprising a drive shaft, a driven shaft, a cam shaft geared to the drive shaft, cams on said cam shaft, a differential cam adjusting mechanism, a control sleeve for the same, a clutch shaft in gear connection with the driven shaft, clutches on said clutch shaft actuated by said cams, the control sleeve being adapted to produce directional and speed ratio variations of said driven shaft, and means for effecting a direct connection of the drive and driven shaft, while said last named gear connection remains at rest, said means being effective when said drive and driven shafts are operating at equal speed, and a single operating lever controlling the actuation of the control sleeve.

10. A transmission mechanism comprising a drive shaft, a cam shaft parallel to the same, a driven shaft in alinement with the drive shaft, a differential set of cams mounted on the cam shaft and positively driven by the drive shaft, governing means mounted on the cam shaft to vary the setting of said cams angularly relatively thereto, a variably rotatable clutch shaft, clutches on said shaft actuated from the cam shaft, gear means connecting the clutch shaft to the driven shaft, and means for connecting the drive shaft direct to the driven shaft and for bypassing the differential set of cams and the said gear means and the clutches on the clutch shaft.

11. A transmission gearing, having a drive shaft and a driven shaft alined therewith, a cam shaft and a countershaft, said cam shaft and countershaft being parallel to each other and to the drive shaft, variable power transmitting elements between said cam shaft and said countershaft, an operating member and means operable by a single manipulation of said operating member for simultaneously establishing a gradually variable relation between said cam shaft and countershaft, and an operative connection between said drive shaft and cam shaft and also between said countershaft and driven shaft, and finally between said driven shaft and drive shaft, while at the same time interrupting all other operative connections.

12. In a transmission gearing, having a drive shaft, a driven shaft alined therewith, a cam shaft and a countershaft parallel with said first named shafts, a manipulating lever, variable power transmitting elements between the cam shaft and the countershaft, means under control of said manipulating lever for pyrogressively altering the relation of said power transmitting elements between the cam shaft and countershaft, and establishing driving relation between the countershaft and driven shaft, and ultimately establishing driving relation between the drive shaft and driven shaft while releasing the drive shaft and the driven shaft from the countershaft.

13. A transmission gearing, comprising a drive shaft, a cam shaft and a countershaft, all parallel to each other, a driven shaft, one-way clutches on said countershaft, eccentrics actuating said one-way clutches and means on the cam shaft for actuating the eccentrics, means under control of a single manipulating lever for rotatably adjusting said cam shaft during operation relatively to the transmitting elements, said manipulating lever also controlling means which serve for establishing driving connection to the drive shaft and between the clutch shaft and the driven shaft.

14. A transmission gearing having a driving shaft, a cam shaft, a gear connection between the same, a clutch for said gear connection, a countershaft, variably operative means connecting the cam shaft and the countershaft, a driven shaft alined with the drive shaft, a gear connection between said driven shaft and the countershaft, a second clutch for said last named gear connection, a third clutch between the drive shaft and driven shaft, and a single means for throwing to operative position the two first named clutches, for varying the operative connecting means between the cam shaft and the countershaft and for finally rendering the third clutch operative while simultaneously rendering inoperative said other clutches and their variable operating means.

WALTER CHARLES PITTER.